United States Patent Office 3,009,463
Patented Nov. 21, 1961

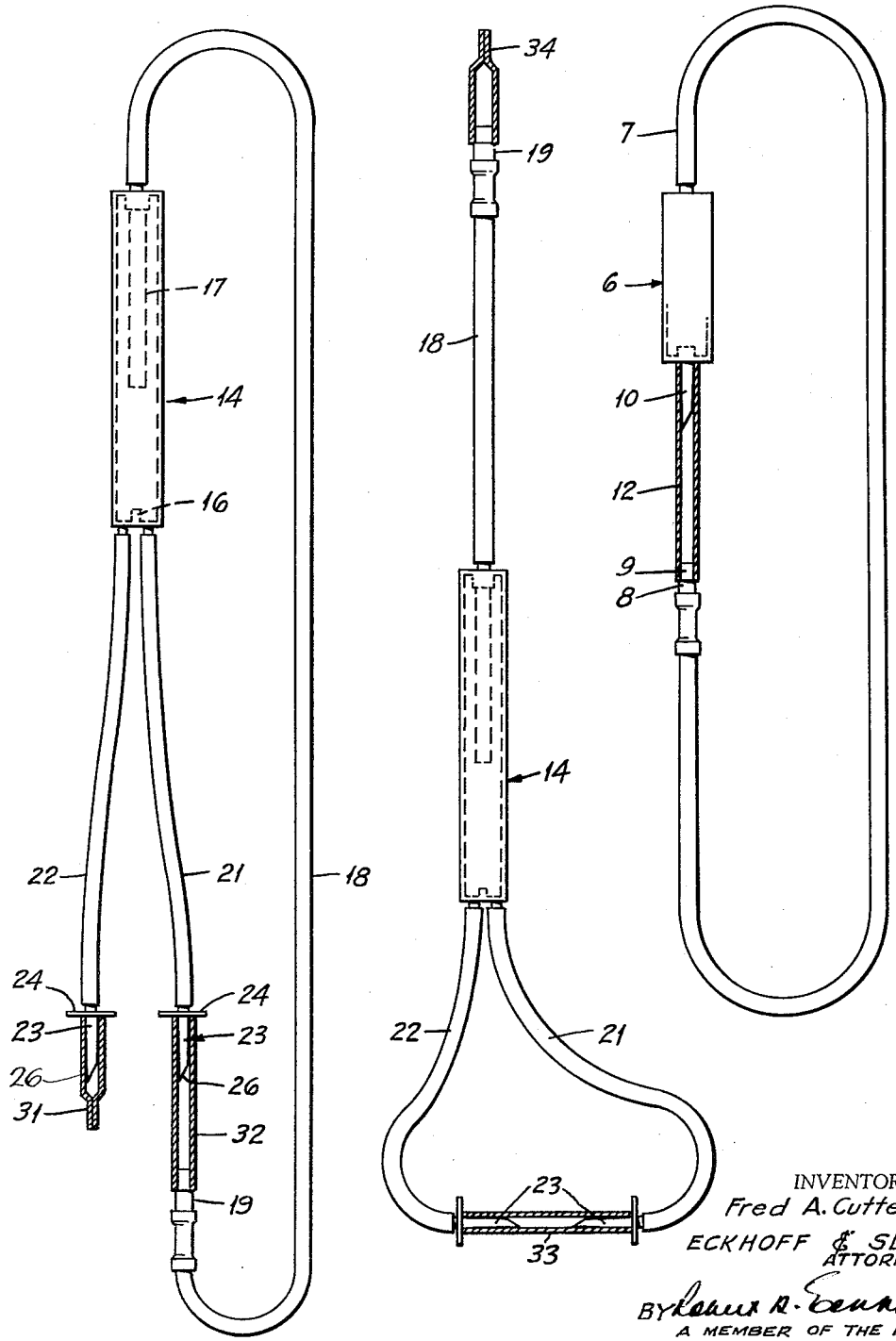

3,009,463
STERILIZING APPARATUS
Fred A. Cutter, Piedmont, Calif., assignor to Cutter Laboratories, Inc., a corporation of Delaware
Original application June 11, 1954, Ser. No. 436,043, now Patent No. 2,802,716, dated Aug. 13, 1957. Divided and this application Jan. 8, 1957, Ser. No. 633,115
3 Claims. (Cl. 128—214)

This invention relates to improvements in the sterilizing of apparatus and for maintaining the sterility of such apparatus, particularly that used for the giving of blood transfusions and the like.

The usual practice in sterilizing such equipment is to place the equipment in a chamber, create a vacuum in the chamber, and then admit a gaseous sterilizing agent such as formaldehyde into the evacuated space. To admit of air escape, allow entrance of the sterilizing agent and maintain sterility when once established, the usual practice heretofore has been to cover each of the ends of the exposed fluid conduit system to be sterilized with a length of rubber or plastic tubing having a cotton wad inserted in its bore. The manufacture of a sterility cover of this nature presents two problems. First: Extreme care must be used in inserting the wad of cotton because an assembly that is too tightly packed will prevent the penetration of the sterilizing vapors, while cotton wadding that is too loosely packed will not provide a bacterial seal sufficient to maintain sterility prior to use. Second: The parts of the equipment in active contact with the rubber or plastic tubing must be separately sterilized prior to assembly since they are not accessible to the sterilizing vapors and since these areas will come into contact with sterile parenteral solutions when the equipment is used.

It is in general the object of the present invention to provide an improved and novel arrangement for the sterilizing of apparatus assembled as a closed and sterile system prior to use.

The invention includes other objects and features of advantage, some of which, together with the foregoing, will appear hereinafter wherein the present preferred form of apparatus is set forth.

In the drawing, the three figures show various apparatus set-ups embodying the present invention, the views being in side elevation and partly in section.

Referring particularly to that embodiment shown in FIGURE 1 of the drawing, a typical set for the administration of intravenous solutions is shown as including drip meter 6 connected by a flexible tube 7 to an adapter 8, the latter having a tapered end 9 for reception of a like tapered end on a needle, not shown; the drip meter includes a spike 10.

In accordance with the present invention, and as a typical practice thereof, the spike 10 on the drip meter and the tapered end 9 of the adapter 8 are covered by a tube 12 of material of limited porosity, as will be explained. It is to be noted that the tube 12 covers fully the spike 10 on the drip meter 6 and the tapered end 9 on the adapter 8. Such equipment provides a closed fluid system, yet it is sterilized effectively when placed in an evacuator and the atmosphere present in the system is exhausted and a suitable sterilizing agent is admitted to the system through the tube 12. At the same time, the sterilizing agent is effective to sterilize those portions of end 9 on the adapter 8 and the spike 10 which are covered by the tube 12.

In that form of blood administration apparatus shown in FIGURES 2 and 3, I have shown a tubular vessel 14 provided with a suitable drip meter orifice 16 at one end thereof, and a filter 17 at the other end. An outlet tube 18 is provided at one end of the vessel 14, the tube having an adapter 19 at its other end. At its drip meter orifice end, the vessel 14 is provided with two flexible tubes 21 and 22, each of these terminating in a spike structure, generally indicated at 23, and including a flange 24 and a sharpened or pointed end 26. In use, the tubes 21 and 22 are connected to separate containers, which may contain the same or different liquids and fluid flows from these through vessel 14 and thence into tube 18, the drip meter serving both tubes 21 and 22.

In accordance with this invention and as is shown in FIGURE 2, the spike end 26 on one of the tubes 21 or 22 is covered with a separate closed tube 31 made of a material of limited porosity, while the sharpened end 26 on the spike 23 on the other tube and the adapter 19 are joined together by a tube conduit 32 of a material of limited porosity. In that form of the apparatus shown in FIGURE 3, the ends of the spike 23 provided on each of the tubes 21 and 22 are joined together by a tube conduit 33, this being made of a material of limited porosity, while the end of adapter 19 is covered by a separate closed tube 34. When these systems are exhausted in an evacuator and a suitable sterilizing agent is admitted to the system, the vaporized sterilizing agent passes through the tubes 31 and 32 in FIGURE 2 and tubes 33 and 34 in FIGURE 3, and so sterilizes the entire interior of the assembled structure as well as the covered portions of each spike 23 and the adapter 19.

The phrase, a material of limited porosity, is used herein and in the claims as referred to a material permitting ready gas passage so the surface protected and the interior surfaces can be sterilized and yet all entrained solid matter, e.g., bacteria, is screened or filtered from the gas or air passing through to the shielding material. Spiral wound chipboard, felted cloth, papier mache and the like are adequate for this purpose. In this specification and in the claims, the term "material or limited porosity" is used as referring to the aforementioned materials and their equivalents.

The apparatus set-up shown and described is set forth only by way of example, and not by way of limitation inasmuch as any other fluid system can be enclosed utilizing a porous tube which admits of effective air evacuation and admission of a sterilizing vapor to the interior of the apparatus set-up and, at the same time, sterilization of the parts physically covered by the porous tube.

From the foregoing, I believe it is apparent that I have provided a novel and improved apparatus for the sterilizing of equipment.

This is a division of application Serial No. 436,043, filed June 11, 1954, now Patent No. 2,802,716.

I claim:

1. A venoclysis set having a fluid conduit including two terminal ends, one of said ends having a spike thereon and the other of said ends having a needle adapter thereon, said spike and said adapter being telescoped into and joined by a single cylindrical protective element, said element being in frictional engagement with the exterior of each of said spike and said adapter, said protective element consisting of a continuous open-ended cylinder of gas-permeable, solid matter-impermeable filtering material, the said gas-permeable structure of the said filtering material constituting the sole means for permitting access of gas to the interior thereof, whereby to permit gas sterilization of the set, including the interior thereof and the exteriors of both spike and needle adapter, by gas circulation throughout the length of said cylindrical element.

2. A venoclysis set having a fluid conduit and including at least one end requiring sterilization before use, said end being telescoped into one end of a single generally cylindrical protective element having the opposite end thereof sealed, said protective element being in frictional engagement with the exterior of the said terminal end, said protective element consisting of a continuous cylinder of gas-permeable, solid matter-impermeable filtering material, the said gas-permeable structure of the said filtering material constituting the sole means for permitting access of gas to the interior thereof, whereby to permit gas sterilization of the set throughout both the interior thereof and the exterior of the said terminal end simultaneously.

3. A transfusion set including a drip meter having two fluid conduits secured thereto, each of said conduits having terminal spikes thereon, said spikes being telescoped into and joined by a single cylindrical protective element, said protective element being in frictional engagement with the exterior of each of said spikes, said protective element consisting of a continuous cylinder of gas-permeable, solid matter-impermeable filtering material, the said gas-permeable structure of the said filtering material constituting the sole means for permitting access of gas to the interior thereof, whereby to permit gas sterilization of both the interior of the set and the exterior of said spikes by gas circulation through the said protective element.

References Cited in the file of this patent

UNITED STATES PATENTS

| | | |
|---|---|---|
| 2,452,643 | Fields | Nov. 2, 1948 |
| 2,675,000 | Ford | Apr. 13, 1954 |
| 2,681,654 | Ryan et al. | June 22, 1954 |
| 2,702,034 | Walter | Feb. 15, 1955 |
| 2,758,598 | Cutter | Aug. 14, 1956 |
| 2,848,995 | Ryan | Aug. 26, 1958 |